Sept. 7, 1965

G. B. RICHARDS ETAL 3,204,659

LIQUID FLOW CONTROL DEVICE

Filed Aug. 29, 1962

INVENTORS
George B. Richards
and Peter J. Contoyanis
By Fidler, Beardsley & Bradley
Att'ys Sept. 7, 1965  G. B. RICHARDS ETAL  3,204,659
LIQUID FLOW CONTROL DEVICE
Filed Aug. 29, 1962  5 Sheets-Sheet 2

INVENTORS
George B. Richards
and Peter J. Contoyanis
By Fidler, Beardsley & Bradley
Attys.

INVENTORS
George B. Richards
and Peter J. Contoyanis
By Fidler, Beardsley & Bradley
Att'ys.

Sept. 7, 1965  G. B. RICHARDS ETAL  3,204,659
LIQUID FLOW CONTROL DEVICE
Filed Aug. 29, 1962  5 Sheets-Sheet 5

INVENTORS
George B. Richards
and Peter J. Contoyanis
By Fidler, Beardsley & Bradley
Att'ys

United States Patent Office 3,204,659
Patented Sept. 7, 1965

3,204,659
LIQUID FLOW CONTROL DEVICE
George B. Richards, Lake Forest, Ill., and Peter J. Contoyanis, Kenosha, Wis., assignors to Liquid Controls Corporation, Chicago, Ill., a corporation of Illinois
Filed Aug. 29, 1962, Ser. No. 220,254
10 Claims. (Cl. 137—504)

This invention relates to liquid flow control devices and has to do more particularly with a device for automatically controlling the flow of liquid therethrough to maintain a predetermined rate of flow in a liquid transmission line.

It is often desirable in a liquid transmission system to limit the rate of liquid flow to a predetermined quantity regardless of any changes in the pressure on the liquid causing it to flow. One example of such need is a fluid dispensing system having a single source of liquid pressure, such as a pump, and a plurality of selectively controlled branch dispensing lines each having a control valve and equipment it is desired to protect against excessive liquid flow, such as a liquid measuring meter. In such a system, assuming that the pump has a predetermined capacity sufficient to supply all the branch lines at the maximum capacity of the measuring meters, then if one or more of the branch lines is closed the pressure on every other branch line is increased, as is the liquid flow through each branch line. Such increase may well exceed the capacity of an individual measuring meter and damage the meter. With the flow control meter of the present invention installed in each branch line the flow therein is limited to a predetermined maximum. It will be understood that the device of the present invention is not limited to the above described use but may be used in many other applications where it is desired to automatically limit the flow in a liquid line in which liquid pressure changes occur.

In accordance with the present invention a liquid flow device is provided having a first relatively fixed element formed with outlet port means including an outlet port or ports therein and a second element movable in the fixed element to variably control the size of the effective area of the port or ports. The flow device is provided with an inlet orifice means the size of which remains fixed during normal operation, but is selectively adjustable to adjust the setting of the device to provide a predetermined rate of flow of liquid therethrough. The arrangement is such that the pressure drop across the orifice means resulting from the flow of liquid therethrough creates a force tending to move the movable element in the direction of flow of the liquid to reduce the effective area of the port means. Means are provided for yieldably opposing the aforesaid movement of the movable element and to cause it to halt in a position wherein the effective area of the port means is such as to limit the liquid flow rate through the device to a predetermined value.

It will be seen from the following description that the device of the present invention operates in the manner of a variable valve which functions to limit the flow of liquid therethrough to a predetermined rate. Accordingly, the device is sometimes referred to herein as a "valve" and the members or elements thereof are referred to as "valve members" or "valve elements."

An object of the invention is to provide a new and improved automatic liquid flow control device.

Another object is to provide an automatic liquid flow control device having a minimum number of very simple parts.

Another object is to provide a novel automatic flow control device which may be made so as to be sensitive to relatively small changes in liquid flow rates therethrough.

Another object is to provide an automatic liquid flow control device which is actuated to throttle the flow through the device by sensing the liquid pressure drop across an orifice in the device through which the liquid flows.

Another object is to provide an automatic liquid flow control device having means for readily adjusting the pressure differential at which the device is operative whereby to permit adjustment of the rate of flow of liquid through the device.

Still another object is to provide an automatic liquid flow control device which is capable of controlling the flow of liquid therethrough to maintain the flow at a predetermined rate regardless of the press differential causing the flow.

Still another object is to provide an automatic liquid flow control device for maintaining a constant liquid flow in a liquid transmission system which is capable of being adjusted to operate with liquids of different viscosities.

Other objects and advantages will appear from the following description taken in connection with the appended drawings wherein.

Figure 1:
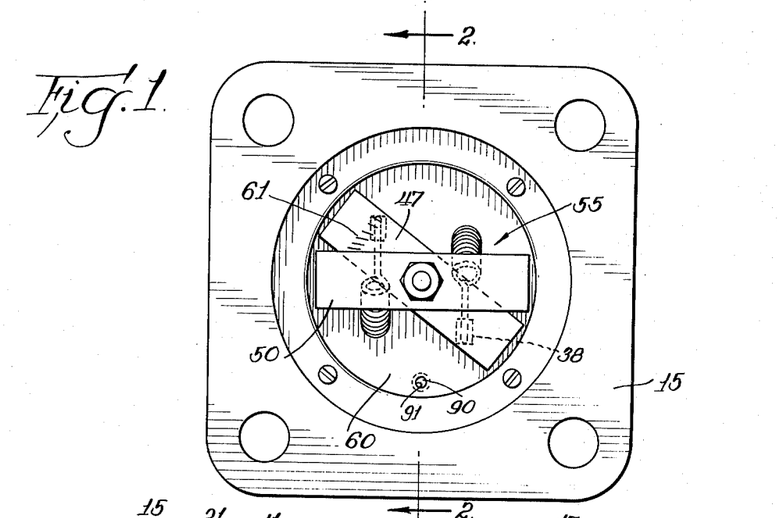
FIG. 1 is an end view of a preferred embodiment of the invention.
Figure 2:
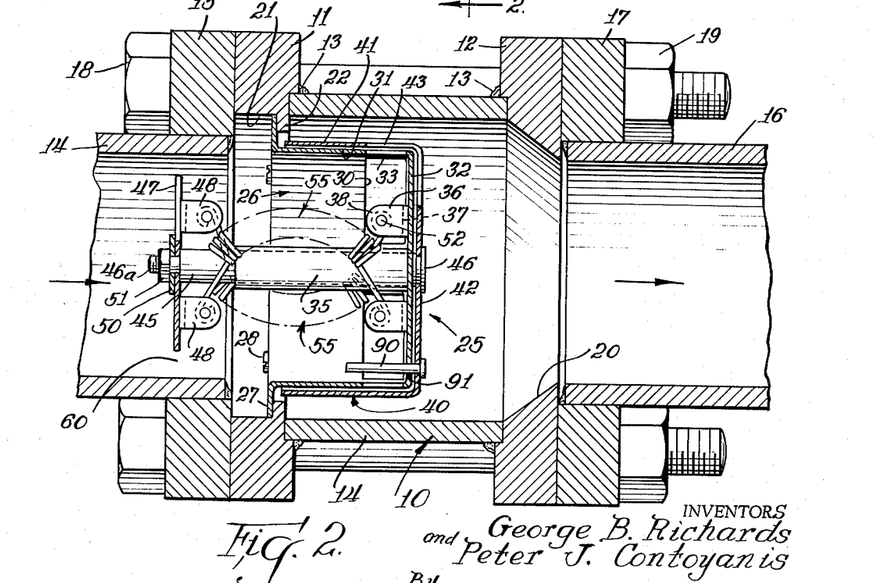
FIG. 2 is a sectional view taken along line 2—2 of FIG. 1 with the device being shown in fully open position.

Referring now to FIGS. 1 and 2, the device is shown as inserted in a pipe line and by way of example in a casing or housing which may comprise a pipe section 10 having flanges 11 and 12 secured thereto as by welding 13. The pipe section 10 is secured between a second section 14 having a flange 15 and a third section 16 having a flange 17. The three sections are suitably connected together as by bolts 18 extending through the flanges 15, 11, 12, and 17 and secured by nuts 19.

The pipe section 10 preferably is of a larger internal diameter than the adjacent sections and the flange 12 is formed with a bore 20 tapering from the diameter of the pipe section 10 to the diameter of the pipe section 16.

The flange 11 is formed with a bore 21 and with a shoulder 22 at the right hand end of the bore and adapted to mount the liquid flow control device 25 now to be described.

The device 25 includes a relatively fixed valve member 26 of generally cupped shape and having a peripheral lip or flange 27 secured to the shoulder 22 as by screws 28. The cup shaped member 26 is formed with a plurality of outlet ports 30 in its side wall 31 which are located preferably adjacent the end wall 32. Preferably the portions 33 of the side wall intermediate the ports 30 are as narrow as practicable consistent with the necessary strength of the member 26 in order to provide a minimum interference with liquid flow through the meter.

Upstanding from the inner face of the end wall 32 is a guide bearing 35 of tubular form for the purpose hereinafter explained. Also projecting from the inner face of the end wall 32 is a pair of U-shaped clevises 36, each having a base 37 secured to the wall 32 as by welding and upstanding arms 38, for the attachment of the operating springs 55 hereinafter described.

A second valve member 40 of generally cupped shape is slidably disposed over the relatively fixed member 26 and is of such size as to provide clearance therebetween. The valve member 40 is formed with side walls 41 overlying the side walls 31 and an end wall 42 overlying the end wall 32. The side walls 41 are formed with openings 43 which correspond generally in size and arrangement with the ports 30 and are adapted to register with the ports 33 when the movable member 40 is in open position, as seen in FIG. 2. The arrangement is such that when the movable member 40 is moved to its closed position, as viewed in FIG. 3, it closes the ports 30. It will be noted that the ports 43 have portions 44 which extend into the end wall 42. Therefore, liquid will not be trapped between the end walls 32 and 42 but can flow freely into and out of the space between such walls as the movable member is moved between its two positions.

The movable member 40 is mounted for movement between its two positions by a stem 45 which is suitably secured as by a rivet head 46 in the end wall 42 and is slidable in the guide bearing 35. The stem 45 is formed with a reduced, threaded end 46a which carries a blade 47 preferably of rectangular form provided with clevises 48 on either side of the stem 45 and similar in construction to the clevises 36. A second blade 50, preferably of rectangular form is supported on the reduced end 46 in face-to-face contact with the blade 47 and the two blades are retained on the stem 45 by a nut 51 threaded on the reduced end 46a. The two blades 47 and 50, which may be designated as a "target," are secured in predetermined angular relationship on the stem 45 by the nut 51. For a purpose which will hereinafter be explained, the blade 50 is adjustable angularly relative to the blade 47.

The movable member 40 is maintained in predetermined angular relation relatively to the fixed member 26 by a pin 90 riveted in the end wall 42 of the movable member 40 and projecting through an opening 91 in the end wall 32 of the fixed member 26. Thus, the openings 43 are positioned to overlie the ports 33 when the movable member 40 is in its open position.

The movable member 40 is normally urged yieldably into its open position by a pair of springs 55, one of which is attached to one of the clevises 36 on the end wall 32 as by a rivet 52 and to oppositely located clevis 48 on the blade 47. The other spring 55 is connected by the other two clevises 36 and 48. Each spring 55 is formed so as to provide a constant or substantially constant resistance to compression. Such a spring is disclosed in United States Patent No. Re. 23,974, reissued April 5, 1955. Such springs are sold under the name "Flexitor" by Hunter Spring Company. The springs are adapted to exert a constant resistance to relative angular movement between their straight end portions and thus exert a constant resistance to the movement of the movable member 40 from open to closed position. Thus, they exert a constant force on the movable member 40 in a direction opposite its closing movement.

The two blades 47 and 50 together obstruct the entry of liquid into the fixed member 26 and provide, with the wall of the pipe section 14, what may be considered an orifice 60. In the arrangement shown the orifice is formed with two major portions on opposite sides of the pair of blades. The arrangement is such that in all positions of the movable member 40, and consequently all positions of the blades 47 and 50, the size of the orifice 60 normally remains the same. However, as will be understood from the foregoing, the size of the orifice 60 can be adjusted by adjusting the angular position of the blade 50 relative to the blade 47. Thus, when the blades are in registry or alignment, there is a maximum orifice provided and when the blades are adjusted to an angular relation, a smaller orifice is provided. Ordinarily, it is sufficient for the purposes of the invention to adjust the blades between a position wherein they are in alignment and a position approximately that shown in FIG. 1, but if desired, the extent of the adjustment of the orifice 60 may be greater. For the purpose of indicating to the operator the exact relative position of the blades and consequently the extent of opening of the orifice, a scale 61 may be provided on the blade 47 with the scale indicia positioned to register with the adjacent edge of the blade 50. The blade 50 ordinarily is set to a predetermined position of adjustment and the meter installed in a pipe line, whereafter no further adjustment is made. However, as will be explained hereinafter, the invention in certain of its embodiments provides means for adjusting the size of the orifice after installation of the meter and in fact during operation.

In operation, the blades 47 and 50 are adjusted prior to installation of the device or after installation of the device in the flange 11 and before complete assembly of the pipe. Flow of liquid through the device from left to right (as viewed in FIGS. 2 and 3) causes liquid to flow through the orifice 60, then into the fixed casing 26 and out through the ports 33 and thence through the openings 43. This flow of liquid creates a pressure drop across the orifice 60 which creates a force (to the right as viewed in FIGS. 2 and 3) tending to urge the blades 47 and 50 and the attached movable member 40 toward the closed position of the movable member 40. Thus the ports 30 are closed to the extent that the movable member 40 is moved toward closed position, and the rate of flow of the liquid through the device is correspondingly reduced. When the rate of flow is reduced to the extent that the pressure drop across the orifice 60 is reduced to a predetermined pressure drop corresponding with the desired rate of flow for which the device is set, no further closing movement of the movable member 40 takes place and the flow of liquid through the device thereby remains constant. This occurs when the force exerted by the springs 55 opposing the closing movement of the member 40 equals the force on such member created by the pressured drop across the orifice 60. Should the pressure drop across the device increase, as by reason of an increase in the pressure on the upstream side or a decrease in pressure on the downstream side, the pressure drop across the orifice 60 will cause the movable member 40 to move toward closed position and into a new position to thereby limit the flow and cause a decrease in the pressure drop across the orifice 60 until a new condition of equilibrium is attained. On the other hand, should the pressure drop across the device decrease, the pressure drop across the orifice 60 will decrease and the springs will urge the movable member 40 toward full open position, thus increasing the rate of flow through the device. When the rate of flow is increased to such an extent that it equals the rate of flow for which the device is set, a new condition of equilibrium is established and the rate of flow will then remain constant at that rate until the pressure drop across the device is changed.

It will be seen that when the flow through the device is reduced to a value below that which will overcome the force of the springs 55 to move the movable member 40, the latter will remain in full open position. On the other hand, when the pressure differential across the device is such as to provide a flow in excess of that for which the device is set, then the movable member 40 will be moved in a closing direction until a condition of equilibrium is established.

Figure 3:
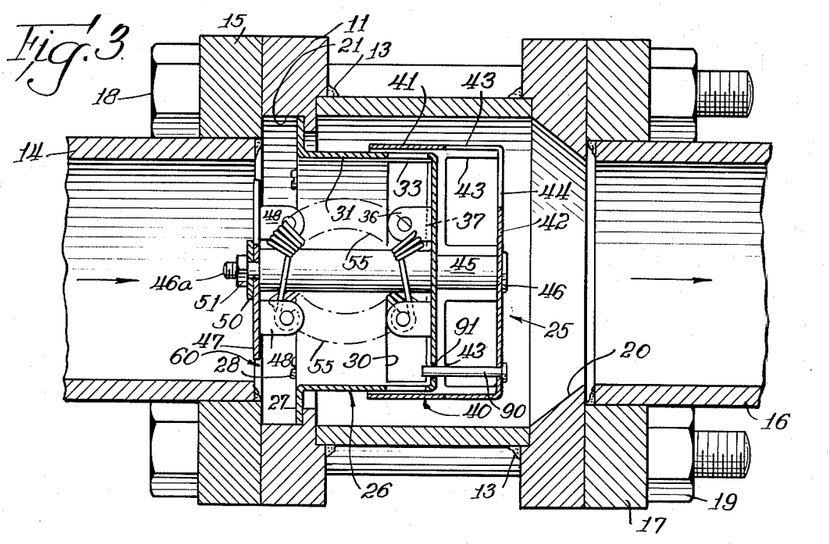
FIG. 3 is a view similar to FIG. 2 only showing the device in fully closed position.

The device shown in FIGS. 1–3 is capable of application in a number of different installations other than that shown in FIGS. 1–3. For example, the device may be installed in a pipe comprising two pipe sections 61 and 62 secured together by flanges 63 and 64 with the flange 27 of the device being clamped between the flanges 63 and 64. In this installation preferably seals (not shown) are provided between the flange 27 and the pipe flanges 63 and 64 respectively. The device 25 shown in FIG. 4 may be identical in all respects to the device shown in FIGS. 1–3 but preferably the flange 27 is slightly enlarged in diameter in order to provide adequate area for clamping the flange 27 and to provide adequate clearance around the device.

Figures 4, 5:
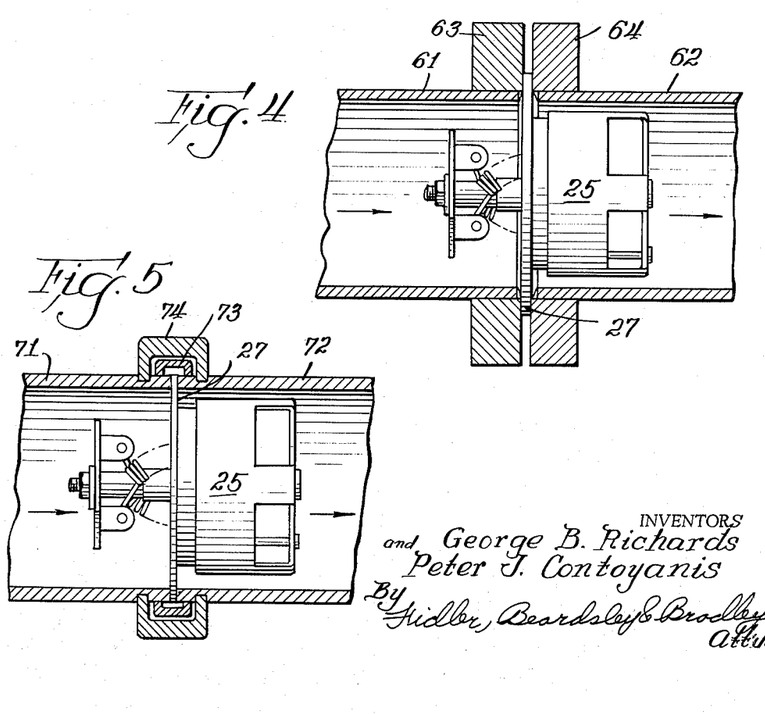
FIG. 4 is a view partially in longitudinal cross section showing the device of FIGS. 1 and 2 incorporated in a flanged pipe joint.
FIG. 5 is a view partially in longitudinal section showing the device of FIGS. 1 and 2 in a victaulic joint.

The device of FIGS. 1–3 also is well adapted for insertion in a "Vitaulic" joint or coupling as shown in FIG. 5. In this construction the flange 27 of the device 25 is clamped between the two pipe sections 71, 72, with a sealing ring 73 around the flange 27, and a connecting member 74 being provided which surrounds the sealing member 73 and connects the two pipe sections 71 and 72 in abutting relation with the flange 27.

The device of the present invention also lends itself readily to adjustment from the exterior of the pipe line so that the device can be adjusted after installation or even during operation.

Figure 6:
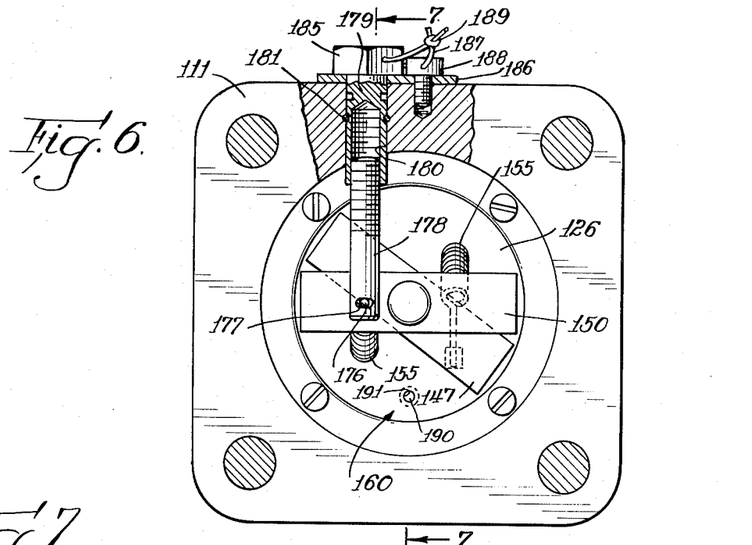
FIG. 6 is an end view partially in cross section of an end view of a second embodiment of the invention.
Figure 7:
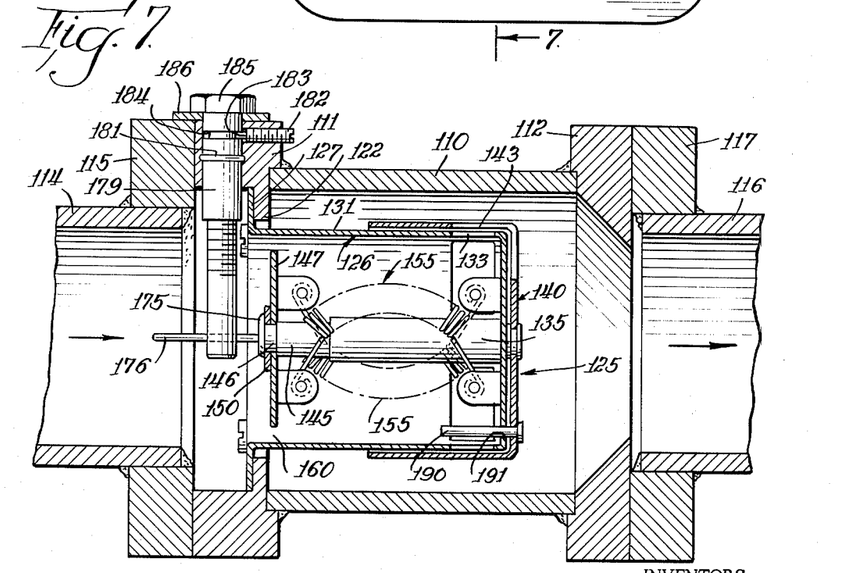
FIG. 7 is a view of a section taken along line 7—7 of FIG. 6.

One such form of device is illustrated in FIGS. 6 and 7, to which reference now is made. The device 125 is supported in a pipe section 110 having secured thereto flanges 111 and 112 to which is secured pipe section 114 having a flange 115 and a pipe section 116 having a flange 117, the pipe sections being secured together as by bolts (not shown).

The device 125 is similar to the device 25 above described except as hereinafter explained. It includes a relatively fixed, cupped member 131 having a flange 127 secured against an internal flange 122 on the flange 111. The device 125 also includes a movable member 140 and having openings 143 adapted to register with the openings 133 in the member 126 when the movable member 140 is in open position. The member 140 carries a stem 145 slidable in a guide bearing 135. The movable member 140 thus is movable axially between a position wherein the openings 133 and 143 are in registry and a position wherein the openings 133 are closed. The movable member 140 is maintained against angular movement about the fixed member 126 by a pin 190 riveted in the end wall of the member 140 and projecting through an opening 191 in the fixed member 126.

A blade 147 is fixedly secured, as by a press fit, on a reduced end 146 of the stem 145 and is connected by constant force springs 155 to the end wall of the fixed member 126. Also carried on the reduced end 145 is a second blade 150, which can move angularly about the axis of the stem 145 and which is retained thereon by a head 175. A stem 176 fixed to the blade 150 and projecting perpendicularly to the plane of the blade extends through a slot 177 provided in an adjusting shaft 178 which is threaded into an adjusting screw 179 journalled in a bore 180 in the flange 111. The adjusting screw 179 is sealed in the bore by an "O" ring seal 181 and is retained in the bore by a set screw 182 having a reduced end 183 engaging a groove 184 in the adjusting screw 179. The adjusting screw 179 is provided with a head 185 which bears against a top plate 186 seated against the edge of the flanges 111 and 115. The adjusted position of the blade 150 may be indicated by cooperating indicia (not shown) on the head of the screw 179 and on the top plate 186.

The adjusting screw 179 may be retained in its adjusted position against tampering by a wire 187 passing through the head 185 and through the head of a screw 188 extending through the top plate 186 and threaded into the flange 111, the wire being retained by a seal 189.

When it is desired to adjust the device, and more particularly the blade 150 relatively to the blade 147 in order to adjust the size of the orifice 160, the adjusting screw 185 (before application of the sealing wire and seal) is turned in one direction or the other to move the adjusting shaft 178 axially in a corresponding direction until the blade 150 is in the desired position of adjustment. The lead of the threads on the shaft 178 are such that one turn of the shaft will move the blade 150 between the position shown in FIG. 6 and a position (not shown) overlying and in registry with the blade 147. When the desired adjustment in position has been effected, the wire 187 is passed through the head 185 and the head 188, and the seal 189 is applied.

It will be understood that the pressure drop over the inlet orifice which is sensed by the device and which is utilized to cause the operation of the device is a function of the viscosity of the liquid. Thus, the pressure drop which results will vary with the viscosity. Where the device is to be used to control the rate of flow of liquids of different viscosities, it is desirable to provide means for setting the adjusting means for the blades such that when the adjusting means is moved to a position corresponding to a particular setting, the desired rate of flow will result. In other words, it is desirable to provide for an initial adjustment of the blades relative to each other, corresponding to the particular viscosity of the liquid with which the device is used, so that in all other positions of adjustment the blades will be positioned to provide the desired pressure drop for the particular fluid with which the device is then used.

Figures 8, 9, 10:
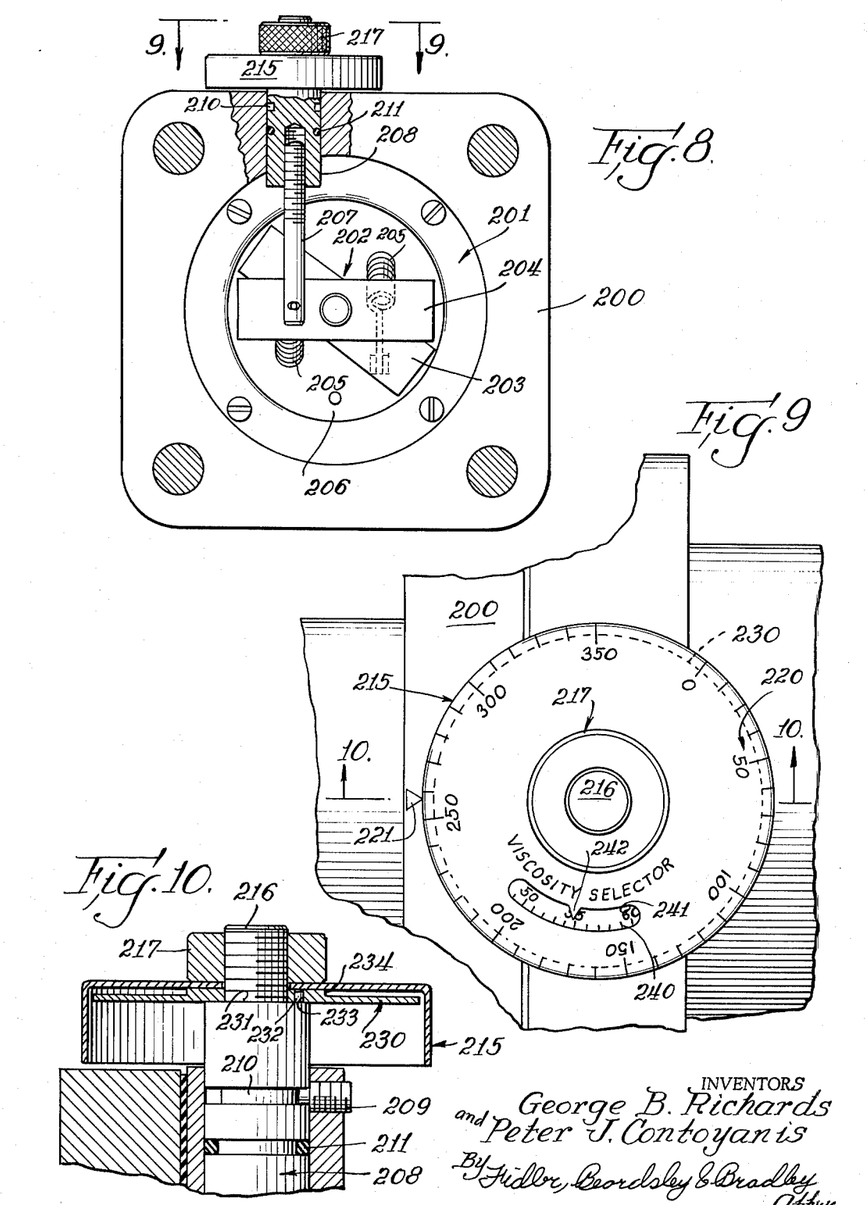
FIG. 8 is an end view partially in cross section of a third embodiment of the invention.
FIG. 9 is an enlarged fragmentary view taken along line 9—9 of FIG. 8.
FIG. 10 is a view of a section taken along line 10—10 of FIG. 9.

A device embodying the aforesaid arrangement is illustrated in FIGS. 8–10, to which reference now is made. The device shown in FIGS. 8–10 is identical in all respects to the device shown in FIGS. 6 and 7 and described in connection therewith, except that the viscosity setting means above mentioned is embodied therein.

Referring to FIG. 8, the device includes a casing or housing 200 having therein a first member 201, similar to the member 126, and a second movable member 202 (not shown completely) similar to the member 140. The second member 202 carries blades 203 and 204 which are connected to the first member 201 by springs 205 similar to the springs 155. The blades 203 and 204 define with the casing 200 an orifice 206.

Connected to the blade 204 is a shaft 207 for the purpose of adjusting the position of such blade relatively to the blade 203 to thereby adjust the size of the orifice 206. The shaft 207 is adjustably threaded into a screw 208 which is journalled in the casing 200 and retained therein by a set screw 209 cooperating with a groove 210 in the screw 208. A sealing ring 211 is provided around the screw as shown. As in the case of the embodiment shown in FIGS. 6 and 7, rotational adjustment of the screw 208 in the housing 200 causes angular movement of the blade 204 relatively to the blade 203.

For the purpose of indicating the position of the blade 204 relatively to the blade 203, an indicator member 215 is carried by a reduced threaded end 216 of the screw 208 and is adjustably secured thereon by a nut 217, the indicator member 215 being clamped in position on screw 208 in a manner hereinafter explained. The indicator member 215 preferably is of cup shape and is provided on its end wall with a scale 220 positioned to cooperate with an index mark 221 on the surface of the casing 200 and adjacent the periphery of the indicator member 215. The scale 220 preferably is calibrated in gallons per minute to indicate the rate of flow of the liquid through the device for which the orifice defining blades are set, but any other suitable calibration may be used. Thus when the indicator member is turned to any particular position, the scale marking which is opposite the index marking 221 will show the rate of flow for which the device is adjusted.

Means are provided for permitting the indicator member 215 to be set to provide for a proper setting of the blade 204 corresponding to the particular viscosity of the liquid. This includes a second indicator member 230 which takes the form of a disk non-rotatably secured on the screw 208. The indicator member 230 may be secured on the shaft in any suitable manner, and for example, is positioned in abutting relation with the shoulder 231 on the shaft, with a stud 232 projecting from the shoulder and extending through an opening 233 in the member 230. The member 230 preferably is provided with a thickened central portion 234 adapted to abut the inner face of the indicator member 215 so as to space the outer portion of the member 230 from the member 215 when the members 215 and 230 are clamped between the nut 217 and the shoulder 231. The indicator member 230 is provided on its face with a scale 240 which is visible through a slot 241 in the end wall of the indicator member 215 and which bears markings corresponding to the viscosity of the liquid with which the meter is to be used. The slot 241 is formed with a pointer 242 adapted to show the relative positions of the indicator member 215 and indicator member 230.

In operation the nut 217 is loosened and the indicator 215 is moved about the axis of the screw 208 until the pointer 242 is opposite the point on the scale 240 corresponding to the viscosity of the liquid with which the device is to be used. Thereafter the nut 217 is tightened to clamp the indicator members 215 and 230 between the nut 217 and the screw 208, thereby maintaining the indicator member 215 in its adjusted position relative to the indicator member 230. Thus, when the indicator member 215 is turned to any particular setting relatively to the index mark 221, the blade 204 will assume a position wherein the orifice 206 is of such size that the rate of flow through the meter is limited to that corresponding to the setting of the indicator member 215.

Should it be desired to use the device with a liquid having a different viscosity than that for which it is originally set, then the nut 217 is loosened and the indicator member 215 is turned to a position to correspond to the new viscosity of the liquid, whereafter the nut 217 is tightened. The indicator member 215 then may be moved to the position corresponding to the desired rate of flow of liquid.

Figures 11, 12:
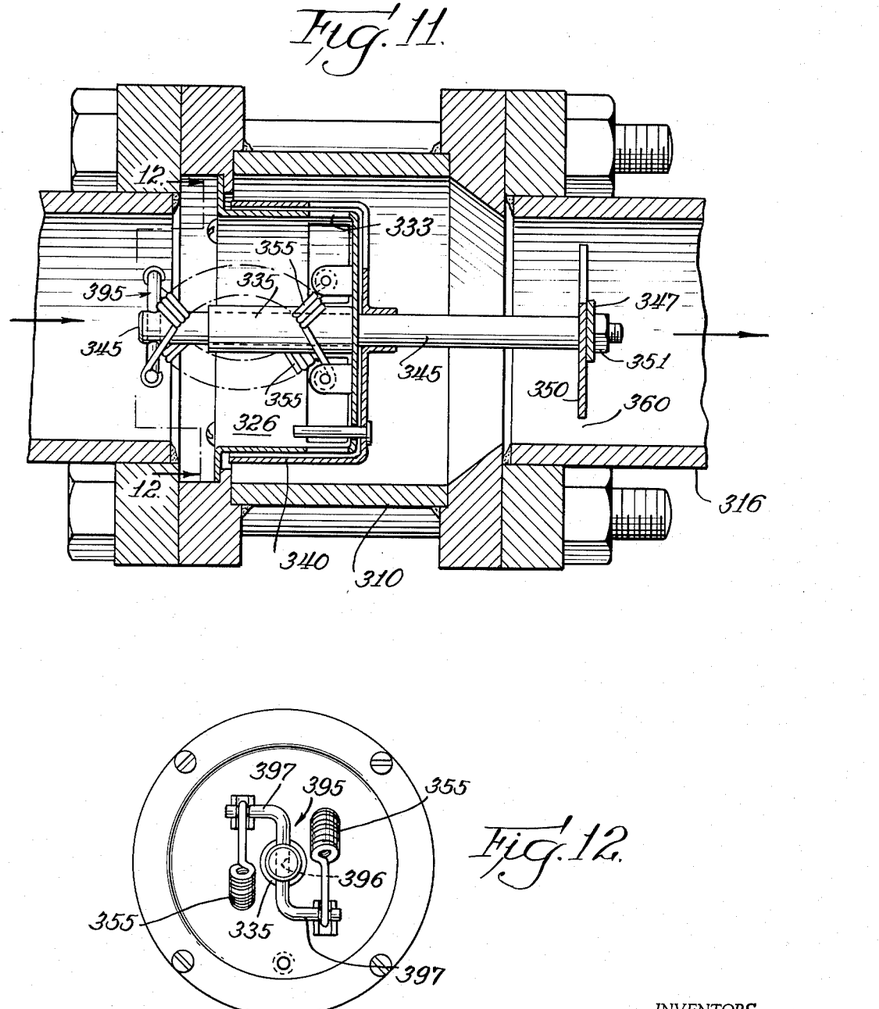
FIG. 11 is a longitudinal sectional view through a fourth embodiment of the invention.
FIG. 12 is a view of the section taken along line 12—12 of FIG. 11.

While in the preferred form of the invention the "target" is located upstream of the valve members, it can, if desired, be located downstreams from such members. A construction wherein the target is located downstream from the valve members is illustrated in FIGS. 11 and 12 to which reference is now made. The device of FIGS. 11 and 12 is generally similar to the device shown in FIGS. 1 to 3 and hence will not be described in detail, it being understood that where the parts are not described in detail they are similar to the corresponding parts shown in FIGS. 1 to 3, inclusive.

The device includes a casing 310 having secured therein a fixed valve member 326 and a valve member 340 slidable thereon between open and closed positions of the ports 333. Upstanding from the inner face of the fixed member 326 is a guide bearing 335 in which is slidable a stem 345 which carries the movable member 340. The stem 345 extends to the right (as viewed in FIG. 11) and into the connected pipe section 316. The target is carried on the end of the stem 345 and includes a blade 350 of rectangular form secured on a reduced portion of the stem (not shown), as by a pressed fit, so that it is non-rotatable on the stem. A second blade 347 is carried on the stem for angular adjustment thereon relatively to the blade 350 and is adapted to be secured in adjusted position by a nut 351.

The flow of liquid through the device is from left to right (as viewed in FIG. 11) and thus the target consisting of the blades 347 and 350 is located on the downstream side of the valve members 326 and 340.

The movable valve member 340 is normally urged toward open position (to the left as viewed in FIG. 11) by constant compression springs 355, each attached at one end to the fixed valve member 326 in a manner similar to that shown in FIGS. 1 to 3 and described in connection therewith. At their other ends the springs 355 are connected to the end of the stem 345 which projects leftwardly from the guide bearing 335. To this end an anchor member 395 of generally "Z" shape is provided, which extends through a bore 396 in the end portion of the stem 345. The ends of the springs 355 are attached to the bent ends of the anchor member 395.

The device shown in FIGS. 11 and 12 operates in a manner generally similar to the device shown in FIGS. 1 to 3, inclusive. However, since the target is located on the downstream side of the valve members the liquid flowing through the device impinges against faces of the blades 347 and 350 which face in the direction of the valve members 326 and 340, after the liquid has passed through the valve members.

The arrangement is such that an orifice 360 is provided between the target and the adjacent pipe 316. The size of the orifice 360 is adjustable by adjusting the angular position of the blade 347 relative to the blade 350.

It will be seen from the foregoing that the present invention provides a new and improved liquid flow control device which automatically, effectively and accurately controls the rate of flow of a liquid therethrough to provide a predetermined rate of flow. The device is effective to control the rate of flow so that regardless of the pressure drop across the device the flow cannot exceed the predetermined rate of flow for which the device is designed and adjusted. Consequently the device is excellently well adapted for use in connection with apparatus where damage might result were it subjected to an excess flow of liquid therethrough. One example of this is in connection with liquid measuring meters as above mentioned.

The device is adjustable whereby it may be adjusted to provide any desired predetermined rate of flow within the limits of the device. In fact, in several embodiments of the invention the device can be adjusted without disconnecting the device from the line and it can even be adjusted during operation. The device also can be adjusted to provide the desired rate of flow where liquids of different viscosities are caused to flow through the device.

It will be understood that the device is fully effective to limit the flow to the desired rate provided the pressure available is at least sufficient to create such rate of flow. However, when the pressure drop falls below the lower end of the range for which the device is designed, the flow will be less than the desired flow. Normally the device is used in a liquid transmission system wherein either the pressure is always sufficient to cause the desired flow or where the fact that the pressure may fall below a value which will cause a flow within this range for which the device is designed will not have any undesired effect on the system.

It will be understood that the device of the present invention can be used as a meter for measuring the flow of liquid therethrough. As above explained, the flow control device is effective automatically to limit the rate of flow therethrough to a predetermined value. Thus, if the liquid is permitted to flow through the device at the predetermined rate for any particular timed period the quantity during such period can be readily computed. For example, if the device is set to provide a flow of two hundred sixty gallons per minute and the flow is continued for a period of ten minutes, it will be seen that the total quantity flowing through the device during such period is twenty six hundred gallons.

The device comprises a relatively small number of relatively simple and inexpensive parts. Hence it can be manufactured and assembled at a comparatively low cost. The parts may be made sufficiently rugged to withstand any shocks and force to which the device may be subjected in normal operation and hence it is not likely to become inoperative or to need repair or replacement of parts.

We claim:

1. A liquid flow control device comprising a casing having an inlet and an outlet, a first member of generally cupped form having a port in its side wall, said first member being secured in said casing with its open end facing toward said inlet, a second member having a tubular side wall, said second member being disposed over said first member for sliding movement relative thereto between a closed position wherein the side wall of said second member overlies and closes said port and an open position wherein said port is exposed, wall means carried by said second member located in the path of flow of liquid through said port, and having an adjustably variable effective area exposed to said liquid flow, and constant force spring means connected between said members and normally urging said second member toward open position.

2. A liquid flow control device comprising a tubular casing having an inlet at one end aligned wtih an outlet at the opposite end, a first member of generally cupped form fixedly mounted within said casing and having symmetrically arranged ports in its side wall, the open end of said first member facing toward said inlet, a second member having a tubular side wall slidably mounted over said first member and having symmetrically arranged ports therein, said second member being slidable between an open position wherein the ports in said first and second members are in overlapping relationship and a closed position wherein an imperforate portion of said second member overlies and closes the ports in said first member, a centrally disposed aperture in an end wall of said first member, a rod-like member connected to said said second member and extending through said aperture toward said inlet, a plurality of orifice-defining members pivotally secured to said rod-like member upstream of said first member and cooperating with said casing to define an orifice having an area adjustably controlled by the relative positions of said orifice defining members, and a plurality of constant force springs respectively interconnected between one of said orifice defining members and said first member, said springs urging said orifice defining member toward said inlet thereby to bias said second member towards said inlet.

3. A fluid flow control device comprising a casing having an inlet and an outlet,
a valve seat mounted in said casing between said inlet and said outlet,
a valve member movable in said casing relative to said seat to control the rate of fluid flow betwen said inlet and said outlet,
wall means carried by said valve member and located in the path of fluid flow through said casing for exerting a fluid operated closing force on said valve member,
said wall means having an adjustably variable effective area exposed to said fluid flow, and
a constant force spring means directly connected between said valve seat and said wall means for applying a constant force on said valve member to bias it toward an open position.

4. A liquid flow control device, comprising a casing having an inlet side and an outlet side,
a first member of generally cupped form having a port in its side wall,
said first member being secured in said casing with its open end facing toward one of said sides,
a second member having a tubular side wall,
said second member being disposed over said first member for sliding movement relative thereto between a closed position wherein said side wall overlies and closes said port and an open position wherein said port is exposed,
wall means carried by said second member and located in the path of flow of liquid through said casing whereby said liquid exerts a closing force on said second member,
constant force spring means connected between said members and normally urging said second member toward open position, and
means connected externally of said casing for adjusting the change in the port area caused by a corresponding change in the rate of liquid flow through said casing.

5. A liquid flow control device as set forth in claim 4 wherein
said port is substantially rectangular.

6. A liquid flow control device comprising a casing having an inlet and an outlet, a first member in said casing having an outlet port and an inlet, a second member having a port therein slidable on said first member axially of said casing between a position wherein the port in said second member is opposed to and exposes said outlet port and a position closing said outlet port wherein an imperforate wall portion of said second member is opposite to and closes said outlet port, wall means carried by said second member disposed in the path of flow of liquid through said casing and upstream from said outlet port and defining with said casing an inlet orifice, and constant force spring means urging said second member toward port exposing position, said orifice defining means including a plurality of members adjustable relatively to each other to vary the size of said orifice.

7. A liquid flow control device comprising a casing having an inlet and an outlet, a first member in said casing having an outlet port and an inlet, a second member having a port therein slidable on said first member axially of said casing between a position wherein the port in said second member is opposite to and exposes said outlet port and a position closing said outlet port wherein an imperforate wall portion of said second member is opposite to and closes said outlet port, wall means carried by said second member disposed in the path of flow of liquid through said casing and upstream from said outlet port, and defining with said casing an inlet orifice, and constant force spring means urging said second member toward port exposing position, said orifice defining means including a plurality of members adjustable relatively to each other to vary the size of said orifice and means for adjusting the relative positions of said members including an adjusting member extending through and adjustably movable in the wall of said casing and connected to one of said adjustable members.

8. A liquid flow control device according to claim 7 including a first indicator member fixedly carried by said adjusting member, a second indicator member carried by said adjusting member and adjustable thereon and therewith and means including indicia on said casing and said indicator members for indicating the positions of said indicator members relatively to each other and to said casing.

9. A liquid flow control device comprising a casing having an inlet and an outlet, a first member of generally cupped form having a rectangular port in its side wall, said first member being secured in said casing with its open end facing toward said inlet, a second member having a tubular side wall, said second member being disposed over said first member for sliding movement relative thereto between a closed position wherein the side wall of said second member overlies and closes said port and an open position wherein said port is exposed, wall means carried by said second member located in the path of flow of liquid, and constant force spring means connected between said members and normally urging said second member toward open position, said wall means including a plurality of members angularly adjustable relative to each other to vary the flow orifice formed by said members, and said casing, means extending out of said casing for adjusting said last members, and means for restraining movement of said last means.

10. A liquid flow control device comprising a casing having an inlet and an outlet, a first member of generally cupped form having a rectangular port in its side wall said first member being secured in said casing with its open end facing toward said inlet, a second member having a tubular side wall, said second member being disposed over said first member for sliding movement relative thereto between a closed position wherein the side wall of said second member overlies and closes said port and an open position wherein said port is exposed, wall means carried by said second member located in the path of flow of liquid, constant force spring means connected between said members and normally urging said second member toward open position, said wall means including a plurality of members which are angularly adjustably relatively to each other to vary the flow orifice formed by said members and said casing, means including a rotatable adjusting screw extending out of said casing for adjusting said last members, a first indicia-bearing member carried by said screw and fixed angularly with respect thereto for rotation therewith and a second indicia-bearing member carried by said screw for rotation therewith and angularly adjustable thereon.

References Cited by the Examiner

UNITED STATES PATENTS

| | | | |
|---|---|---|---|
| 257,069 | 4/82 | Reznor | 137—504 XR |
| 627,390 | 6/99 | Cash | 137—535 |
| 996,099 | 6/11 | Leidecher | 132—515.7 |
| 1,055,291 | 3/13 | Richardson | 132—504 XR |
| 2,457,438 | 12/48 | Bennett | 285—112 |
| 2,584,418 | 2/52 | Branson | 137—504 |
| 2,800,919 | 7/57 | Kates | 137—504 |
| 2,845,087 | 7/58 | Thomas | 137—504 |
| 2,967,543 | 1/61 | Viergutz | 137—504 XR |
| 3,131,716 | 5/64 | Griswold et al. | 137—515.7 XR |

FOREIGN PATENTS 771,027  3/57  Great Britain.

M. CARY NELSON, *Primary Examiner.*

MARTIN P. SCHWADRON, *Examiner.*